United States Patent

[11] 3,593,321

[72] Inventor Wolfgang Kraft
Bad Hersfeld, Germany

[21] Appl. No. 725,235
[22] Filed Apr. 29, 1968
[45] Patented July 13, 1971
[73] Assignee Zuse K.G.
Bad Hersfeld, Germany
[32] Priority Apr. 29, 1967, June 23, 1967
[33] Germany
[31] Z 12823 and Z 12913

[54] MATRIX STORAGE
12 Claims, 4 Drawing Figs.

[52] U.S. Cl. 340/174
[51] Int. Cl. G11c 7/02, G11c 11/06
[50] Field of Search 340/174

[56] References Cited

UNITED STATES PATENTS

| | | | |
|---|---|---|---|
| 3,130,391 | 4/1964 | Merz | 340/174 |
| 3,271,744 | 9/1966 | Petersen et al. | 340/174 X |
| 3,243,787 | 3/1966 | Habib | 340/174 |
| 3,278,915 | 10/1966 | Joseph | 340/174 |

*Primary Examiner*—Stanley M. Urynowicz, Jr.
*Attorney*—Michael S. Striker

ABSTRACT: A group of rows repeatedly intersects a group of columns. Switchable elements are placed at each intersection of a row and a column which are switched from a first state to a second state if a signal is present in both the intersecting row and column. All elements at intersection points created by the first intersection of the group of rows with the group of columns belong to a first information plane, all elements at intersections corresponding to the second intersection of said group of rows with the columns correspond to a second information plane, etc. A shunt wire is provided for each group of elements in any one column in any information plane, and switching elements select either the shunt wire or the corresponding group of elements. Individual driving circuits may be provided for each row and each column, or a number of columns may be connected together to form a column group connected to a single column driving circuit. Switching units are provided for jointly operating all switching elements in any one information plane, which belong to different column groups.

INVENTOR
WOLFGANG KRAFT
BY Michael S. Striker
ATTORNEY

Inventor:
Wolfgang Kraft
By Michael S. Striker
Attorney

Inventor:
Wolfgang Kraft
By Michael S. Striker
Attorney

Inventor
Wolfgang Kraft
By Michael S. Striker
Attorney

MATRIX STORAGE

BACKGROUND OF THE INVENTION

This invention relates to matrix storage arrangements, and in particular to matrix storage arrangements in which elements, which are switched from a first state to a second state by a unit signal, are situated at the intersection of columns and rows, and are adapted to be switched from said first state to said second state by the presence of a signal in both the corresponding row and column. Further, the matrix storage arrangements to which this invention relates, comprise a group of columns, and a group of rows repeatedly intersecting said columns along the length thereof, so as to form a plurality of information planes at each of which each of said rows intersects each of said columns.

In known arrangements of this type, a read wire is wired diagonally through the elements comprised in each group of intersection. It should be noted that throughout this application the "columns" and "rows" of the connecting matrix are used to denote matrix components in two mutually perpendicular directions. The actual physical direction of each is of course completely immaterial to this invention. In known arrangements of this type, in order to prevent all elements corresponding to a particular row and column which are energized from switching, an additional wire is supplied for the columns in each information plane. The additional wires pertaining to those information plane whose elements are not to be energized are then furnished with a negative signal to prevent switching of said elements. Thus, more negative signals must be furnished, the greater the number of information plane whose elements are to remain unenergized. This requires a great deal of power for the negative signals or, as is generally the case, inhibit pulses. A substantial amount of equipment is therefore generally required for the circuits furnishing these inhibit pulses. Furthermore, the known arrangement has the disadvantage that the inhibit pulses often cause interference in the read lines, thus decreasing the reliability of the system.

SUMMARY OF THE INVENTION

This invention comprises a storage arrangement, with a matrix having a group of columns and a group of rows repeatedly intersecting said columns along the length thereof, so as to form a plurality of information planes, at each of which each of said rows intersects each of said columns. It further comprises a plurality of elements, each adapted to be switched from a first state to a second state by a unit signal. Said elements are arranged in such a manner that one is situated at each intersection of a row and a column, and is responsive to signals transmitted along both said row and said column. The invention further comprises a plurality of first driving means, one for each of said rows, each adapted to furnish a predetermined percentage of said unit signal to its corresponding row upon energization. A plurality of second driving means is also furnished, one for each of said columns, and each adapted to supply the remaining part of said unit signal to the elements in the corresponding column upon energization. Shunt means, one for all elements in any one column of each information plane, furnish an alternative path to the corresponding elements. A plurality of switching means, each adapted to select either one of said alternative paths or its corresponding elements, are also provided. A plurality of switching units, each adapted to control substantially simultaneously all switching means corresponding to a given information plane are also provided. However, if at least two of said columns are connected together and jointly connected to one of said second driving means, the switching means corresponding to each of said jointly connected columns must be controlled by a different switching unit.

DESCRIPTION OF THE PREFERRED EMBODIMENTS

Figure 1:
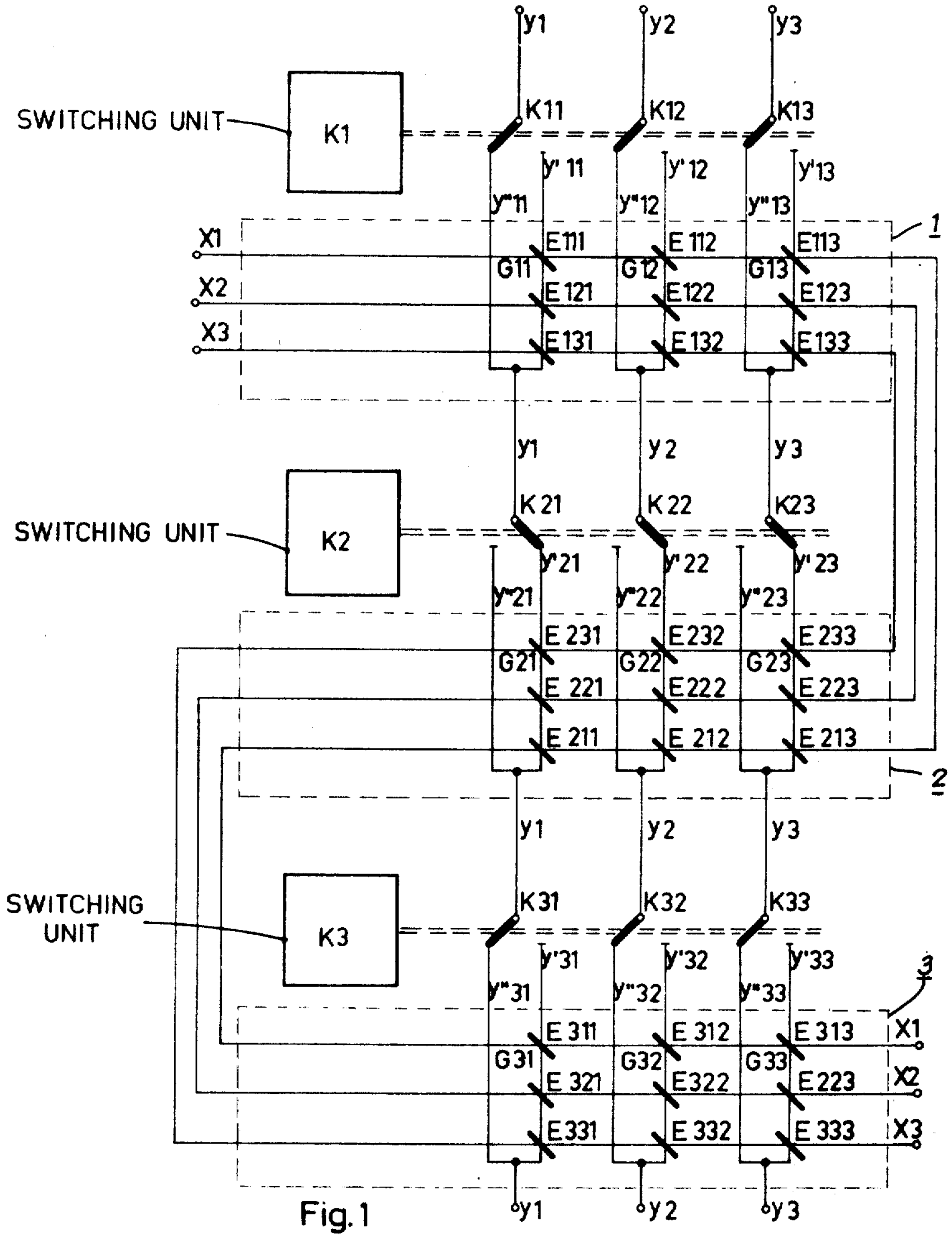
FIG. 1 is a diagram illustrating the basic operation of a first embodiment of a storage according to this invention.

The operation of the storage arrangement according to this invention will now be described with reference to the drawing.

FIG. 1 shows a matrix having columns $y1$, $y2$ and $y3$ and rows $x1$, $x2$ and $x3$, repeatedly intersecting said columns along their length, thus forming information planes 1, 2, and 3 indicated by the dashed lines. It should be noted, that while for this example the rows repeatedly intersect the columns, the other arrangement, wherein columns intersect rows, is electrically and in its functioning completely identical and can be obtained by merely rotating the figure by 90° degrees. For purposes of clarity, only three rows and three columns are illustrated in FIG. 1. The invention may of course be extended to an arbitrary number of rows and columns. Each column has a first and second end terminal marked $y$ with the appropriate subscript in the Figure, and it is to these end terminals that one of said second driving means, namely a pulse-generating circuit and selector switch (not illustrated), is connected. Similarly, one each of first driving means consisting of similar pulse-generating circuits and selector switches are connected to the end terminals $x1$–$x1$, etc., of the rows.

Each element, for example E111, E112, E113, etc., is adapted to switch from a "0" to a "1" state when a pulse is furnished through both its corresponding row and column. For example, element E111 will switch when a pulse is sent both through row $x1$ and column $y1$. All elements in an information plane within any one column form a subgroup. For example, subgroup G11 is formed by elements E111, 121 and 131. Shunt means, here a wire labeled $y''$ with appropriate subscript, as for example $y''11$ for the wire bypassing elements in subgroup G11, supply alternative paths to each of said subgroups. Whether a subgroup of elements is selected, or its alternative shunt path, is determined by a plurality of switching elements shown as K11, K12, K13, etc., in FIG. 1. As shown in FIG. 1, all switching elements corresponding to one information plane may be controlled by one switching unit as for example K1, K2 or K3.

The operation of the above-described storage will now be explained. First, let it be assumed that all elements are in the "0" state. It should also be assumed that the position of the switching elements K11, K12, etc., is as shown in FIG. 1. If now a pulse is sent over row $x2$ and column $y1$ such that together the unit signal required to switch an element from the "0" to the $l$ state is formed, then only element E221 will be switched from the "0" to the $l$ state, since for elements E121 and E321 switches K11 and K31 prevent the passage of that part of the unit signal contributed by column $y1$. Thus, the combined use of column selection, row selection and switching unit allows selection of any one element in the matrix storage, and accomplishes a change of state of said element.

Figure 2:
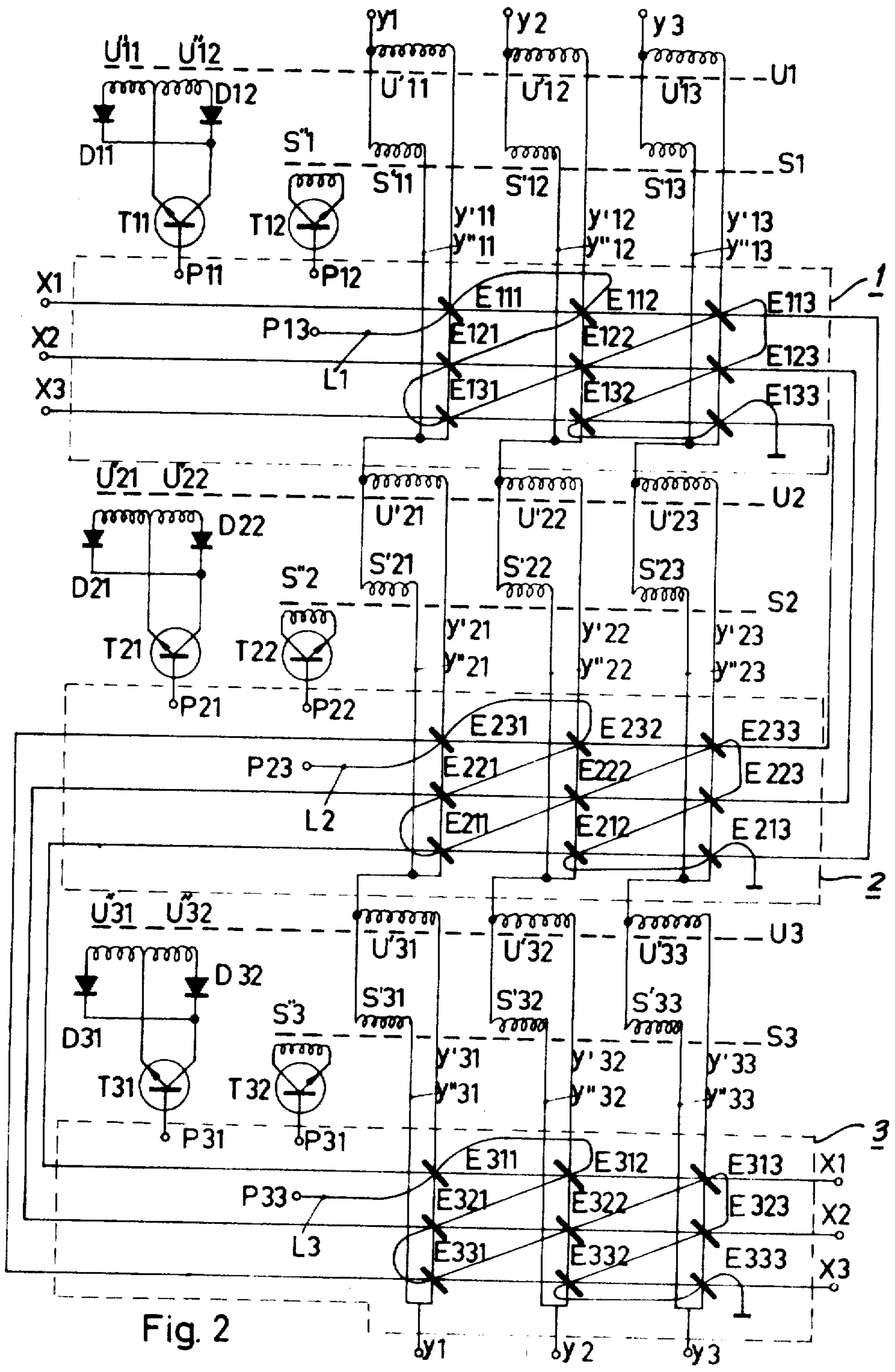
FIG. 2 is a more detailed diagram of the arrangement according to FIG. 1.

FIG. 2 shows a more detailed diagram of the embodiment of FIG. 1, in particular as far as the switching elements and switching units are concerned. Reference to FIGS. 1 and 2 will show that the switching elements and associated switching units are replaced by the primary windings of first and second transformer means U and S, the secondary windings of said first and second transformer means U and S, and means for short-circuiting said secondary windings labeled T. As a concrete example, the switching elements K11, K12, K13, and associated switching unit K1 are replaced as follows: The primary windings U'11, U'12 and U'13 of first transformer means U1 are connected in series with the elements of subgroup G11, G12, and G13, respectively. Primary windings S'11, S'12 and S'13 of second transformer means S1 are connected in series with the shunt means bypassing each of the above-mentioned subgroups of elements. All primary windings of transformers U and S have substantially the same inductive reactance. These primary windings constitute controllable impedance means. If, for example, the impedance of primary winding U'12 were low, and that of primary winding S'12 were high, then the signal carried over column $y2$ would pass through elements E112, E122 and E132 while, for the case of a high impedance of primary winding U'12 and a low impedance of primary winding S'12, the current in column $y2$ would bypass subgroup G12. The impedance of the primary windings is controlled by means of secondary windings U'' and S'' and the associated rectifiers and transistors shown in FIG. 2. These arrangements take the place of the switching units, and the arrangement taking the place of switching unit K1 will now be described in detail. The end terminals of the secondary winding of transformer U1 have connected thereto the cathodes of rectifiers D11 and D12, respectively. The anodes of said rectifiers are connected together, and jointly connected to the collector of transistor T11 whose emitter is connected to a center tap of said secondary winding and whose base is connected to terminal P11 adapted to receive switching pulses. The secondary winding of transformer S1 is connected across the emitter-collector path of transistor T12, whose base is connected to terminal P12, which is also adapted to receive switching pulses.

In order to illustrate the operation of the system of FIG. 2, it will now be assumed that all elements are originally in the "0" state. If it is now desired to switch one element, for example element E132, to the "1" state, it is necessary to send pulses over both row $x3$ and column $y2$. Preferably, each of these pulses consists of a pulse equal to one-half the value necessary to switch the element. Furthermore, a pulse is introduced at point P11 which causes the emitter-collector path of transistor T11 to become conductive and thus cause one-half of the secondary winding of transformer U1 to be short-circuited. Which half of the transformer secondary winding is short-circuited depends on the current direction in column $y2$. The short-circuiting of the half of the secondary winding results in a low impedance being reflected back into the primary windings U'11, U'12 and U'13 of transformer U1 so that current is allowed to flow in all elements E111, E112,...E133, of this information plane. In particular, this includes the desired element E132. At the same time, the switching pulse applied at point P12 is such that transistor T12 remains nonconductive, thus causing a high impedance to be reflected into primary windings S'11, S'12 and S'13 of transformer S1, thus preventing current from entering these shunt paths.

Depending on whether the elements corresponding to E132 in the other information planes, namely elements E232 and E332, are to be switched or not to be switched simultaneously with element E132, transistors T21 and T22 and T31 and T32 respectively are pulsed in either the same or in the opposite direction to transistor T11 and T12 of information plane 1. These transistors may for example be pulsed in dependence on the condition of storage elements in a register, as is well known. If for example the element E232 is to remain in state "0,"then transistors I21 and T22 are respectively controlled in such a manner that the primary winding U'22 exhibits a high impedance and the primary windings S'22 exhibits a low impedance. The pulse reaching element E232 by means of row $x3$ is then insufficient to cause this element to switch to the "1" state, since the pulse contributed by column $y2$ is bypassed by shunt means $y''22$. Those elements which are switched from a "0" state to a "1" state cause pulses to appear on read wires L1, L2 and L3 in known fashion, which pulses may be entered into corresponding positions in a register.

If it is now desired to read the information contained in the storage, that is to determine whether a given element is in the "0" or "1" state, then a negative pulse is supplied over the corresponding row and column. For example, if it is desired to determine whether element E132 is in a "0" or "1" state, a negative pulse having a magnitude of one-half the unit signal is supplied over both row $x3$ and column $y2$. Furthermore, transistors T11 and T12 are controlled in such a manner that the primary windings S'12 and U'12 respectively exhibit a high and a low impedance. If element E132 is in the "1" state, this condition will cause a pulse to be generated on the corresponding read wire L1. If, however, element E132 stored the information "0, " then no pulse appears on line L1.

It is possible to read out simultaneously the information stored in corresponding elements in each information plane. Thus, it is possible to simultaneously read out the information in elements E132, E232 and E332. Pulses will then be generated simultaneously over corresponding read lines L1, L2 and L3, if the elements contained a "1" information. These pulses may then be stored in corresponding places in a register, which is not illustrated.

Since the currents flowing through columns $y1$, $y2$ and $y3$ are in opposite direction for the reading and writing process, respectively, the secondary windings of transformers U are center tapped, each half, with its associated rectifier, allowing the secondary current in the appropriate direction to be short-circuited.

The storage matrix arrangements are generally arranged on frames. Transformers U and S may be embodied in toroidal cores which are fixed to the matrix frame by dip soldering.

Figure 3:
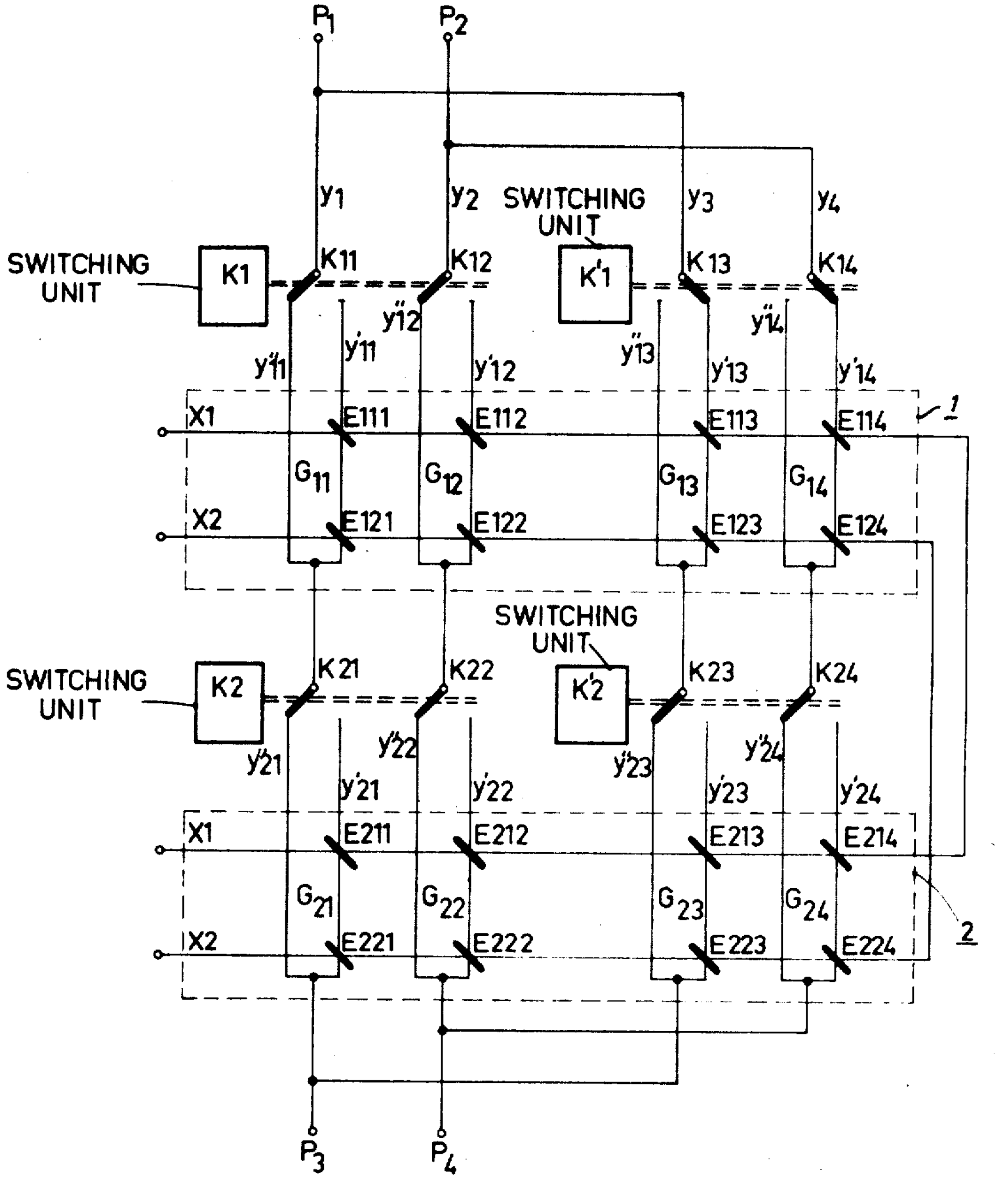
FIG. 3 shows an embodiment of a storage arrangement wherein a plurality of columns is connected to one driving circuit.

The matrix shown in FIG. 3 consists of four columns $y1$, $y2$, $y3$ and $y4$ and two rows $x1$ and $x2$ each intersecting said columns in two places, thus forming information planes 1 and 2, both indicated in dashed lines. While only 16 elements E111...E224 are shown for purposes of simplicity, the arrangement may of course be extended arbitrarily both as to rows and as to columns. It will be noted that columns $y1$ and $y3$ are connected together at both ends, as are columns $y2$ and $y4$. Joint terminals P1 and P3 of columns $y1$ and $y3$ are connected to one driving means (not shown) while points P2 and P4 common to both columns $y2$ and $y4$ are connected to a second one of said second driving means (also not shown). In this particular example, column groups containing two columns each (for example, column group 1 contains columns 1 and 3) were formed. However, more columns may be included within any column group, assuming an appropriate number of switching units is furnished as will be discussed below. The same definitions used in relation to FIG. 1 will be used in relation to FIG. 3, that is, elements pertaining to one column in each information plane (for example, E111 and E121) constitute subgroups. Switching means are again provided to select either a subgroup or its corresponding shunt path. The main difference between FIG. 3 and FIG. 1 will be noted to lie in the number of switching units required to control the switching means. While in FIG. 1 one switching unit is furnished to control all switching elements in a particular information plane, it will be noted that this is not the case in FIG. 3. Whenever a plurality of columns is connected together, it is required that each of these columns is associated with a different switching unit. Otherwise, selection of a single element within a matrix is not possible. thus, for example, in FIG. 3, columns 1 and 3 are connected together. Column $y1$ is therefore associated with switching unit K1, while column $y3$ is associated with switching unit K'1. Similarly, since columns $y2$ and $y4$ are connected together, column $y2$ is associated with switching unit K'1, while column $y4$ is associated with switching unit K'1. It becomes obvious that it is possible to save column driving circuits at the expense of additional switching units. The particular combination used in a practical application will be determined by the relative numbers of columns and information planes required, as well as by the cost of the driving and switching units.

The operation of the circuit shown in FIG. 3 is entirely identical to that of FIG. 1. In particular, if it is desired to switch element E123 from the "0" to the "1" state, a pulse is conducted over row $x2$ and, by way of terminals P1 and P3, columns $y1$ and $y3$. Since, however, switching elements K11 are in the position selecting the shunt path $y''11$, element E121 will not be energized. Since switch K13, controlled by switching unit K'1, is in the position for allowing current to pass through subgroup G13, element E123 is energized.

Figure 4:
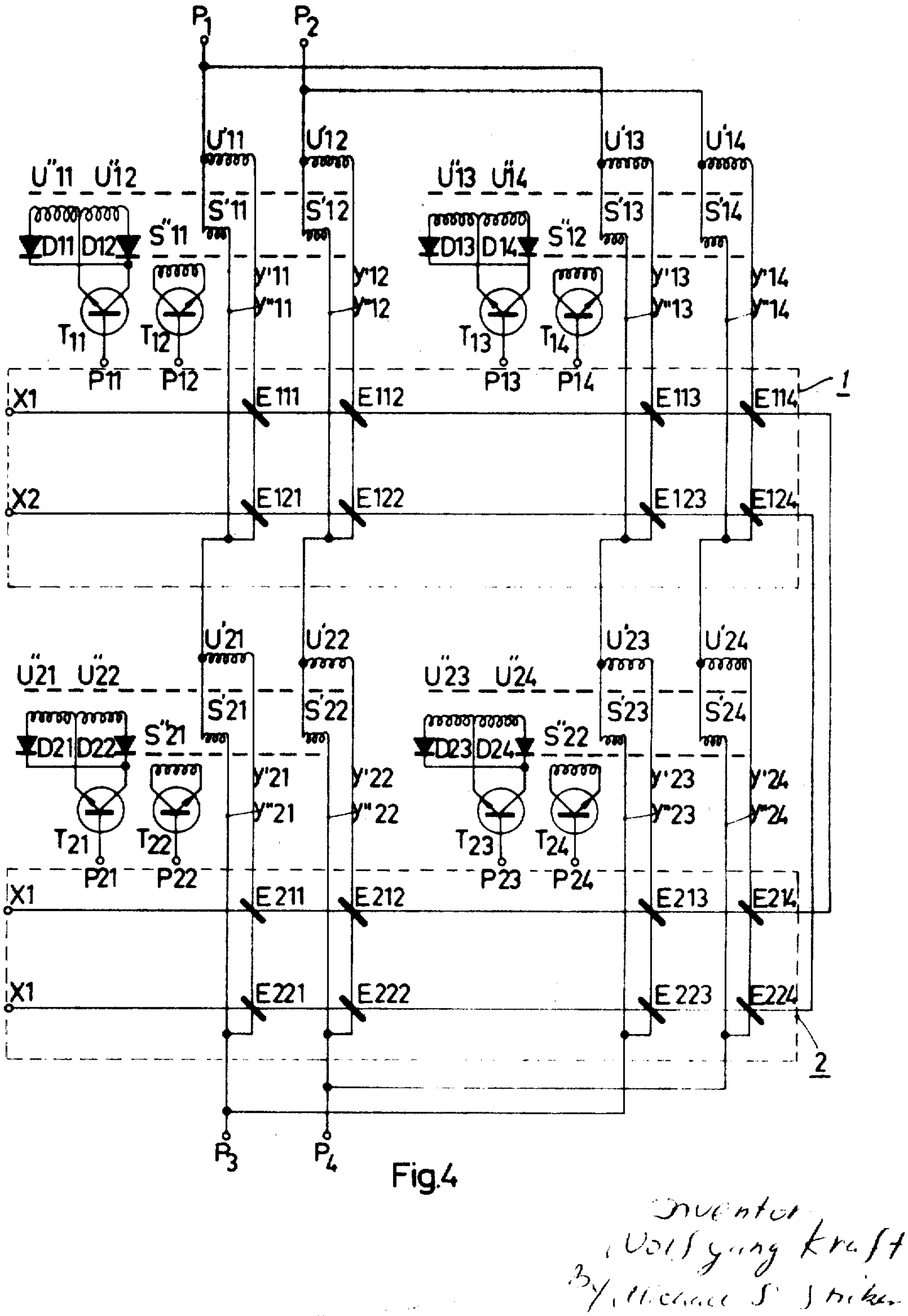
FIG. 4 is a more detailed diagram of the embodiment of FIG. 3.

FIG. 4 shows a more detailed schematic diagram of the embodiment of FIG. 3, in particular as regards the switching elements and switching units. The embodiment of each switching unit and of each switching elements is identical to that shown in FIG. 2. Since the operation of the circuit is identical to that shown in FIG. 2, except for the assignment of switching units which was discussed in detail with regard to FIG. 3, the operation of this circuit will also not be explained in detail. Each switching elements is again replaced by the primary windings of first and second transformer means labeled U and S respectively, while the switching units are replaced by the secondary windings of said transformer means and associated rectifier and transistor means. Again, current is caused to flow through a particular subgroup by causing a low impedance to be reflected back into the primary winding of transformer U, while a high impedance is reflected back into the primary winding of transformer S. The opposite impedance condition exists if it is desired that the column current passed through the shunt path rather than the selected subgroup.

While this invention has been illustrated and described as embodied in arrangements having particular numbers of rows and columns, it is not intended to be limited to the details shown, since various modifications, structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meeting and range of equivalence of the following claims.

What is claimed as new and desired to be protected by Letters Patent is set forth in the appended claims:

1. A storage arrangement, comprising, in combination, a plurality of information planes each including memory elements arranged in rows and columns, each memory element switching from a first state to a second state in response to a unit signal; a plurality of row selection conductors each linking a corresponding row of memory elements in all of said information planes; a plurality of column selection conductors each linking a corresponding column of memory elements in all of said information planes; first driving means operative when reading and when writing to supply a predetermined percentage of said unit signal to a selected one of said row conductors; and second driving means for furnishing the remainder of said unit signal to a selected one of said column conductors when reading and writing and switch means for furnishing a connection from said second driving means to that portion of said selected one of said column conductors linking memory elements in a selected one of said information planes, and for bypassing those portions of said selected one of said column conductors linking memory elements in all others of said information planes.

2. A storage arrangement as set forth in claim 1, wherein said switch means comprise a plurality of shunt means, each bypassing upon selection that portion of one of said column conductors linking memory elements in any one of said information planes; a plurality of switching elements, each selectively operable to furnish a signal path to one of said shunt means or to that portion of a column conductor shuntable by said one of said shunt means; and a plurality of switching units each operating a determined number of said switching elements.

3. A storage arrangement as set forth in claim 2, wherein said switching elements comprise a plurality of first controllable impedance means, one connected in series with each of said portions of column conductor bypassed by one of said shunt means; and a plurality of second controllable impedance means, each connected in series with a corresponding one of said shunt means.

4. A storage arrangement as set forth in claim 3, wherein each of said first controllable impedance means comprises the primary winding of first transformer means; wherein said second controllable impedance means each comprise the primary winding of second transformer means; and wherein said switching units each comprise the secondary winding of said first transformer means; means for short-circuiting said secondary winding of said first transformer means when the impedance of said primary windings of said first transformer means is to be a low impedance; and wherein each of said switching units further comprises the secondary winding of said second transformer means; and means for short-circuiting said secondary winding of said second transformer means when said primary windings of said second transformer means are to have a low impedance.

5. A storage arrangement as set forth in claim 4, wherein said secondary winding of said first transformer means has a first end terminal, a second end terminal, and a center tap; wherein said means for short-circuiting said secondary winding of said first transformer means comprise first and second rectifier means, each having a first terminal connected to one of said end terminals, and a second terminal connected to the second terminal of the other of said rectifier means; and transistor means having an emitter-collector path connected between said center tap and said rectifier second terminals, said transistor means also having a base for to receiving signals to cause said emitter-collector path to become conductive; and wherein said means for short-circuiting said secondary winding of said second transformer means comprise second transistor means having an emitter-collector path connected across said secondary winding of said second transistor means, and a base for receiving signals to cause said emitter-collector path to become conductive.

6. A storage arrangement as set forth in claim 5, wherein all of said primary windings of said first transformer means and said secondary winding of said first transformer means are wound on a toroidal core; and wherein all the windings of said second transformer means are wound on a second toroidal core.

7. A storage arrangement as set forth in claim 6, wherein said toroidal cores are rigidly mounted to a matrix frame.

8. A storage arrangement as set forth in claim 7, wherein said toroidal cores are mounted on said matrix frame by means of dip soldering.

9. A storage arrangement as set forth in claim 2, wherein at least two of said column conductors are connected in parallel and jointly connected to a single one of said second driving means.

10. A storage arrangement as set forth in claim 9, wherein each of said column conductors is connected in parallel with at least one other of said column conductors, thereby forming a plurality of column groups; wherein each of said column groups is connected to a corresponding one of said second driving means; and wherein each of said switching units controls switching elements of the same information plane, but belonging to different ones of said column groups.

11. A storage arrangement as set forth in claim 10, wherein the number of column conductors in each of said column groups is substantially the same.

12. A storage arrangement as set forth in claim 2, and wherein said plurality of switching units comprises one switching unit for each of said information planes, each of said switching units operating all switching elements of its associated information plane substantially simultaneously.